(12) United States Patent
Itano et al.

(10) Patent No.: US 11,939,515 B2
(45) Date of Patent: Mar. 26, 2024

(54) REFRIGERANT-CONTAINING COMPOSITION, HEAT TRANSFER MEDIUM, AND HEAT CYCLE SYSTEM

(71) Applicant: DAIKIN INDUSTRIES, LTD., Osaka (JP)

(72) Inventors: Mitsushi Itano, Osaka (JP); Shun Ohkubo, Osaka (JP); Hitomi Kuroki, Osaka (JP); Yasufu Yamada, Osaka (JP); Tatsumi Tsuchiya, Osaka (JP); Kenji Gobou, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 641 days.

(21) Appl. No.: 17/260,838

(22) PCT Filed: Jul. 8, 2019

(86) PCT No.: PCT/JP2019/027031
§ 371 (c)(1),
(2) Date: Jan. 15, 2021

(87) PCT Pub. No.: WO2020/017386
PCT Pub. Date: Jan. 23, 2020

(65) Prior Publication Data
US 2021/0269693 A1 Sep. 2, 2021

(30) Foreign Application Priority Data

Jul. 17, 2018 (JP) .................................. 2018-134448
Dec. 4, 2018 (JP) .................................. 2018-227398
Dec. 7, 2018 (JP) .................................. 2018-230259

(51) Int. Cl.
*C09K 5/04* (2006.01)
*F25B 13/00* (2006.01)

(52) U.S. Cl.
CPC .............. *C09K 5/045* (2013.01); *F25B 13/00* (2013.01); *C09K 2205/22* (2013.01); *C09K 2205/40* (2013.01)

(58) Field of Classification Search
CPC ........................... C09K 5/045; C09K 2205/22; C09K 2205/40; C09K 2205/126
See application file for complete search history.

(56) References Cited

U.S. PATENT DOCUMENTS 2,309,224 A 1/1943 Terry et al.
6,054,064 A * 4/2000 D'Aubarede .......... C09K 5/045
252/67

(Continued)

FOREIGN PATENT DOCUMENTS

CA 3 015 523 9/2017
CN 102245731 11/2011

(Continued)

OTHER PUBLICATIONS

International Search Report dated Sep. 3, 2019 in International (PCT) Application No. PCT/JP2019/027031.

(Continued)

*Primary Examiner* — Lionel Nouketcha
(74) *Attorney, Agent, or Firm* — Wenderoth, Lind & Ponack, L.L.P.

(57) ABSTRACT

The present disclosure provides a composition comprising a refrigerant (mixed refrigerant), the composition having three types of performance; i.e., a coefficient of performance (COP) and a refrigerating capacity (Cap) that are equivalent to or higher than those of R404A and/or R410A, and a sufficiently low GWP. The present disclosure specifically provides a composition comprising a refrigerant, the refrigerant comprising difluoromethane (HFC-32), 2,3,3,3-tetrafluoropropene (HFO-1234yf), and at least one of 1,1-

(Continued)

difluoroethylene (HFO-1132a) and tetrafluoroethylene (FO-1114).

14 Claims, 2 Drawing Sheets

(56) References Cited

U.S. PATENT DOCUMENTS

| | | | |
|---|---|---|---|
| 6,658,882 | B2 | 12/2003 | Ohama et al. |
| 8,168,077 | B2 | 5/2012 | Spatz |
| 8,961,811 | B2 | 2/2015 | Minor et al. |
| 10,072,194 | B2 * | 9/2018 | Tasaka .................. C09K 5/045 |
| 10,131,827 | B2 | 11/2018 | Fukushima et al. |
| 11,365,335 | B2 | 6/2022 | Itano et al. |
| 11,441,819 | B2 | 9/2022 | Itano et al. |
| 11,447,613 | B2 | 9/2022 | Fabian et al. |
| 2006/0243945 | A1 * | 11/2006 | Minor .................... C08J 9/149 |
| | | | 252/67 |
| 2010/0122545 | A1 | 5/2010 | Minor et al. |
| 2011/0252801 | A1 | 10/2011 | Minor et al. |
| 2011/0253927 | A1 | 10/2011 | Minor et al. |
| 2011/0258146 | A1 | 10/2011 | Low |
| 2013/0193368 | A1 | 1/2013 | Low |
| 2014/0077123 | A1 * | 3/2014 | Fukushima ............ C09K 5/044 |
| | | | 570/136 |
| 2015/0027156 | A1 | 1/2015 | Bellamy, Jr. |
| 2015/0051426 | A1 | 2/2015 | Fukushima et al. |
| 2015/0322232 | A1 | 11/2015 | Hong et al. |
| 2015/0322321 | A1 | 11/2015 | Deur-Bert et al. |
| 2015/0376486 | A1 | 12/2015 | Hashimoto et al. |
| 2016/0002518 | A1 | 1/2016 | Taniguchi et al. |
| 2016/0075927 | A1 | 3/2016 | Fukushima |
| 2016/0097569 | A1 | 4/2016 | Matsunaga |
| 2016/0333243 | A1 | 11/2016 | Fukushima et al. |
| 2016/0333244 | A1 | 11/2016 | Fukushima |
| 2016/0340565 | A1 | 11/2016 | Tasaka et al. |
| 2016/0347980 | A1 | 12/2016 | Okamoto |
| 2017/0002245 | A1 | 1/2017 | Fukushima |
| 2017/0058171 | A1 | 3/2017 | Fukushima et al. |
| 2017/0058172 | A1 | 3/2017 | Fukushima et al. |
| 2017/0058173 | A1 | 3/2017 | Fukushima |
| 2017/0058174 | A1 | 3/2017 | Fukushima et al. |
| 2017/0138642 | A1 | 5/2017 | Ueno et al. |
| 2017/0146284 | A1 | 5/2017 | Matsunaga et al. |
| 2017/0218241 | A1 | 8/2017 | Deur-Bert et al. |
| 2018/0002586 | A1 * | 1/2018 | Low ........................ C11D 7/50 |
| 2018/0051198 | A1 | 2/2018 | Okamoto et al. |
| 2018/0057724 | A1 | 3/2018 | Fukushima |
| 2018/0079941 | A1 | 3/2018 | Ueno et al. |
| 2018/0320942 | A1 | 11/2018 | Hayamizu et al. |
| 2020/0041174 | A1 | 2/2020 | Wakabayashi et al. |
| 2020/0048520 | A1 | 2/2020 | Fukushima |
| 2020/0079986 | A1 | 3/2020 | Fukushima |
| 2020/0326100 | A1 | 10/2020 | Ukibune et al. |
| 2020/0326103 | A1 | 10/2020 | Kumakura et al. |
| 2020/0326109 | A1 | 10/2020 | Kumakura et al. |
| 2020/0385622 | A1 | 12/2020 | Itano et al. |
| 2020/0393178 | A1 | 12/2020 | Kumakura et al. |
| 2021/0198549 | A1 | 7/2021 | Fukushima |
| 2022/0089928 | A1 | 3/2022 | Fukushima |
| 2022/0389299 | A1 | 12/2022 | Itano et al. |
| 2022/0404070 | A1 | 12/2022 | Ohtsuka et al. |
| 2023/0002659 | A1 | 1/2023 | Itano et al. |

FOREIGN PATENT DOCUMENTS

| | | |
|---|---|---|
| CN | 104837951 | 8/2015 |
| CN | 105164227 | 12/2015 |
| CN | 105452417 | 3/2016 |
| CN | 106029821 | 10/2016 |
| CN | 106029823 | 10/2016 |
| CN | 106133110 | 11/2016 |
| CN | 106414654 | 2/2017 |
| CN | 106414682 | 2/2017 |
| CN | 107614651 | 1/2018 |
| CN | 107614652 | 1/2018 |
| CN | 108699428 | 10/2018 |
| CN | 111032817 | 4/2020 |
| CN | 111479894 | 7/2020 |
| EP | 0 811 670 | 12/1997 |
| EP | 3 012 556 | 4/2016 |
| EP | 3 101 082 | 12/2016 |
| EP | 3 109 292 | 12/2016 |
| EP | 3 121 242 | 1/2017 |
| EP | 3 153 559 | 4/2017 |
| EP | 3 153 567 | 4/2017 |
| EP | 3 305 869 | 4/2018 |
| EP | 3 423 541 | 1/2019 |
| EP | 3 666 848 | 6/2020 |
| EP | 3 739 018 | 11/2020 |
| EP | 3 825 382 | 5/2021 |
| FR | 3 000 095 | 6/2014 |
| GB | 2530915 | 4/2016 |
| GB | 2566809 | 3/2019 |
| JP | 9-324175 | 12/1997 |
| JP | 2012-510550 | 5/2012 |
| JP | 2013-529703 | 7/2013 |
| JP | 5689068 | 3/2015 |
| JP | WO2015/136977 | 9/2015 |
| JP | 2015-214927 | 12/2015 |
| JP | 2015-229767 | 12/2015 |
| JP | 2016-11423 | 1/2016 |
| JP | 2016-501978 | 1/2016 |
| JP | 2016-028119 | 2/2016 |
| JP | 2016-539208 | 12/2016 |
| JP | 6105511 | 3/2017 |
| JP | 2017-145380 | 8/2017 |
| JP | 2018-104565 | 7/2018 |
| JP | 2018-104566 | 7/2018 |
| JP | 2018-177966 | 11/2018 |
| JP | 2018-177967 | 11/2018 |
| JP | 2018-177968 | 11/2018 |
| JP | 2018-177969 | 11/2018 |
| JP | 2018-179404 | 11/2018 |
| JP | 2018-184597 | 11/2018 |
| JP | 2019-34972 | 3/2019 |
| JP | 2019-034983 | 3/2019 |
| JP | 2019-512031 | 5/2019 |
| JP | 2019-207054 | 12/2019 |
| KP | 2015-229767 | 12/2015 |
| KR | 10-2011-0099253 | 9/2011 |
| KR | 10-2015-0099530 | 8/2015 |
| KR | 10-2018-0118174 | 10/2018 |
| MX | 2018010417 | 11/2018 |
| WO | 2005/105947 | 11/2005 |
| WO | 2009/036537 | 3/2009 |
| WO | 2010/059677 | 5/2010 |
| WO | 2010/064011 | 6/2010 |
| WO | 2011/163117 | 12/2011 |
| WO | 2014/085973 | 6/2014 |
| WO | 2014/102477 | 7/2014 |
| WO | 2014/178352 | 11/2014 |
| WO | 2014/203356 | 12/2014 |
| WO | WO2014/203353 | 12/2014 |
| WO | 2015/015881 | 2/2015 |
| WO | 2015/054110 | 4/2015 |
| WO | 2015/115252 | 8/2015 |
| WO | 2015/125874 | 8/2015 |
| WO | 2015/125885 | 8/2015 |
| WO | 2015/141678 | 9/2015 |
| WO | 2015/186557 | 12/2015 |
| WO | 2015/186670 | 12/2015 |
| WO | 2015/186671 | 12/2015 |
| WO | WO2015/186558 | 12/2015 |
| WO | 2016/075541 | 5/2016 |
| WO | 2016/182030 | 11/2016 |
| WO | 2016/190177 | 12/2016 |
| WO | 2016/194847 | 12/2016 |
| WO | 2017/122517 | 7/2017 |
| WO | 2018/193974 | 10/2018 |
| WO | 2019/030508 | 2/2019 |
| WO | 2019/123782 | 6/2019 |
| WO | 2019/124396 | 6/2019 |

(56) References Cited

FOREIGN PATENT DOCUMENTS

| WO | 2019/124398 | 6/2019 |
|----|-------------|--------|
| WO | 2019/124399 | 6/2019 |
| WO | 2019/172008 | 9/2019 |
| WO | 2020/017520 | 1/2020 |
| WO | 2020/017521 | 1/2020 |
| WO | 2020/017522 | 1/2020 |
| WO | 2020/071380 | 4/2020 |
| WO | 2020/256129 | 12/2020 |
| WO | 2020/256131 | 12/2020 |
| WO | 2020/256134 | 12/2020 |

OTHER PUBLICATIONS

International Preliminary Report on Patentability dated Jan. 19, 2021 in International (PCT) Application No. PCT/JP2019/027989.
International Search Report dated Sep. 10, 2019 in International (PCT) Application No. PCT/JP2019/027989.
International Preliminary Report on Patentability dated Jan. 19, 2021 in International (PCT) Application No. PCT/JP2019/027988.
International Search Report dated Sep. 10, 2019 in International (PCT) Application No. PCT/JP2019/027988.
International Preliminary Report on Patentability dated Jan. 19, 2021 in International (PCT) Application No. PCT/JP2019/027990.
International Search Report dated Oct. 21, 2019 in International (PCT) Application No. PCT/JP2019/027990.
International Preliminary Report on Patentability dated Jul. 27, 2021 in International (PCT) Application No. PCT/JP2020/002974.
International Search Report dated Apr. 14, 2020 in International (PCT) Application No. PCT/JP2020/002974.
International Search Report dated Jan. 28, 2020 in International (PCT) Application No. PCT/JP2019/047097.
International Search Report dated Mar. 31, 2020 in International (PCT) Application No. PCT/JP2019/050501.
Extended European Search Report dated Apr. 21, 2021 in European Patent Application No. 19912660.8.
Takahashi et al., "Construction of Comprehensive Reaction Model for Predicting Tetrafluoroethylene Explosion by High-Pressure Shock Tube", (https://kaken.nii.ac.jp/), Research Result Report of Grants-in-Aid for Scientific Research, 2018, 4 pages, Abstract.
Otsuka et el., "Development of control method of HFO-1123 disproportionation and investigation of probability of HFO-1123 disproportionation", AGC Research Report, 2018, No. 68, pp. 29-33, Abstract.
International Search Report dated Mar. 31, 2020 in International (PCT) Application No. PCT/JP2020/003943.
International Search Report dated Mar. 31, 2020 in International (PCT) Application No. PCT/JP2020/003990.
International Search Report dated Jul. 21, 2020 in International (PCT) Application No. PCT/JP2020/016787.
International Search Report dated Jul. 28, 2020 in International (PCT) Application No. PCT/JP2020/17777.
FEI Qian, Chief Editor, Marine Auxiliary Engine, 3rd Ed., p. 224-225, Dalian Maritime University Press, Feb. 2008, with English translation.
Trane Air Conditioning Manual, Chapter X, The Air Conditioning System, pp. 303-359, 1996.

* cited by examiner

REFRIGERANT-CONTAINING COMPOSITION, HEAT TRANSFER MEDIUM, AND HEAT CYCLE SYSTEM

TECHNICAL FIELD

The present disclosure relates to a composition comprising a refrigerant, a heat transfer medium, and a heat cycle system.

BACKGROUND ART

Fluorinated hydrocarbons free of chlorine in their molecular structure, such as difluoromethane ($CH_2F_2$), R32, boiling point: −52° C.), pentafluoroethane ($CF_3CHF_2$, R125, boiling point: −48° C.), 1,1,1-trifluoroethane ($CF_3CH_3$, R143a, boiling point: −47° C.), 1,1,1,2-tetrafluoroethane ($CF_3CH_2F$, R134a, boiling point: −26° C.), 1,1-difluoroethane ($CHF_2CH_3$, R152a, boiling point: −24° C.), and 2,3,3,3-tetrafluoropropene ($CF_3CF=CH_2$, 1234yf, boiling point: −29° C.), have been used in refrigerants for air conditioners, refrigerating machines, refrigerators, and other similar equipment.

Of these fluorinated hydrocarbons, there have been proposed, for example, a three-component mixed refrigerant consisting of R32, R125, and R134a in respective amounts of 23, 25, and 52 wt % (R407C); and a three-component mixed refrigerant consisting of R125, 143a, and R134a in respective amounts of 44, 52, and 4 wt % (R404A). For example, Patent Literature 1 and Patent Literature 2 disclose using R404A as a refrigerant for freezing and refrigeration.

However, R404A is known to have a very high global warming potential (GWP) of 3922, which is higher than that of $CHClF_2$ (R22, GWP=1810), a chlorine-containing fluorinated hydrocarbon. Thus, there is demand for the development of an alternative refrigerant with a reduced GWP for R404A. For example, Patent Literature 3 and Patent Literature 4 disclose a refrigerant composition comprising difluoromethane (R32), pentafluoroethane (R125), 2,3,3,3-tetrafluoropropene (1234yf), and 1,1,1,2-tetrafluoroethane (R134a) as an alternative refrigerant for R404A.

R410A (GWP=2088), as well as R404A, is also known. As an alternative refrigerant therefor, R454B with a reduced GWP (designated as trade name "DR-5A" in Patent Literature 5; 68.9 wt % R32/31.1 wt % R1234yf, GWP: 466, 102% COP (relative to R410A), 97% Cap. (relative to R410A)) has been proposed in Patent Literature 5. However, even in R454B, a GWP of 466 is the limit.

CITATION LIST

Patent Literature

PTL 1: JPH09-324175A
PTL 2: U.S. Pat. No. 8,168,077
PTL 3: WO2010/059677
PTL 4: WO2011/163117
PTL 5: WO2016/075541

SUMMARY OF INVENTION

Technical Problem

An object of the present disclosure is to provide a refrigerant composition (mixed refrigerant) that can serve as an alternative refrigerant for R404A and/or R410A, the refrigerant composition having three types of performance; i.e., a coefficient of performance (COP) and a refrigerating capacity (cooling capacity, capacity (Cap)) that are equivalent to or higher than those of R404A and/or R410A, and a sufficiently low GWP.

Solution to Problem

1. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114).

2. The composition according to Item 1, wherein the refrigerant comprises HFO-1132a.

3. The composition according to Item 2, wherein the refrigerant comprises HFC-32 in an amount of 15.0 to 24.0 mass % and HFO-1132a in an amount of 1.0 to 7.0 mass %, based on the total amount of HFC-32, HFO-1234yf, and HFO-1132a taken as 100 mass %.

4. The composition according to Item 2, wherein the refrigerant comprises HFC-32 in an amount of 19.5 to 23.5 mass % and HFO-1132a in an amount of 3.1 to 3.7 mass %, based on the total amount of HFC-32, HFO-1234yf, and HFO-1132a taken as 100 mass %.

5. The composition according to Item 1, wherein
the refrigerant comprises HFC-32, HFO-1234yf, and HFO-1132a, and
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a triangular region surrounded by line segments RS, ST, and TR that connect the following 3 points:
point R (21.80, 3.95, 74.25),
point S (21.80, 3.05, 75.15), and
point T (20.95, 75.30, 3.75),
or on the line segments.

6. The composition according to any one of Items 1 to 5, for use as an alternative refrigerant for R404A.

7. The composition according to Item 1,
wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments LF, FG, GO, OB, and BL that connect the following 5 points:
point L (74.0, 19.9, 6.1),
point F (49.1, 25.9, 25.0),
point G (0.0, 48.6, 51.4),
point O (0.0, 0.0, 100), and
point B (73.9, 0.0, 26.1),
or on the line segments (excluding the line segments GO and OB),
the line segment LF is represented by coordinates ($y=0.0021x^2-0.4975x+45.264$),
the line segment FG is represented by coordinates ($y=0.0031x^2-0.6144x+48.6$), and
the line segments GO, OB, and BL are straight lines.

8. The composition according to Item 1,
wherein
the refrigerant comprises HFC-32, HFO-1234yf, and HFO-1132a, when the mass % of HFC-32, HFO-1132a, and HFO-1234yf based on their sum in the refrigerant is respectively represented by x, y, and z, coordinates (x, y, z) in a ternary composition diagram in which the sum of RFC-32, HFO-1132a, and HFO-1234yf is 100 mass % are within the range of a figure surrounded by line segments PF, FG, GO, OB', and B'P that connect the following 5 points:

point P (59.1, 23.2, 17.7),
point F (49.1, 25.9, 25.0),
point G (0.0, 48.6, 51.4),
point O (0.0, 0.0, 100), and
point B' (59.0, 0.0, 40.2),
or on the line segments (excluding the line segments GO and OB' ),
the line segment PE is represented by coordinates $(y=0.0021x^2-0.4975x+45.264)$,
the line segment FG is represented by coordinates $(y=0.0031x^2-0.6144x+48.6)$, and
the line segments GO, OB', and B'P are straight lines.

9. The composition according to Item 1, wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments MI, IJ, JB, and BM that connect the following 4 points:

point M (74.0, 19.5, 6.5),
point I (62.9, 15.5, 21.6),
point J (33.5, 0.0, 66.5), and
point B (73.9, 0.0, 26.1),
or on the line segments (excluding the line segment JB),
the line segment MI is represented by coordinates $(y=0.006x^2+1.1837x-35.264)$,
the line segment IJ is represented by coordinates $(y=0.0083x^2-0.2719x-0.1953)$, and
the line segments JB and BM are straight lines.

10. The composition according to Item 1, wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments QJ, JB', and B'Q that connect the following 3 points:

point Q (59.1, 12.7, 28.2),
point J (33.5, 0.0, 66.5), and
point B' (59.0, 0.0, 40.2),
or on the line segments (excluding the line segment JB'),
the line segment QJ is represented by coordinates $(y=0.0083x^2-0.2719x-0.1953)$, and
the line segments JB' and B'Q are straight lines.

11. The composition according to Item 1, wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments QU, UV, and VQ that connect the following 3 points:

point Q (59.1, 12.7, 28.2),
point U (59.0, 5.5, 35.5), and
point V (52.5, 8.4, 39.1),
or on the line segments,
the line segment VQ is represented by coordinates $(y=0.0083x^2-0.2719x-0.1953)$,
the line segment UV is represented by coordinates $(y=0.0026x^2-0.7385x'39.946)$, and
the line segment QU is a straight Line.

12. The composition according to any one of Items 7 to 11, for use as an alternative refrigerant for R410A.

13. The composition according to any one of Items 1 to 5, for use as an alternative refrigerant for R12, R134a, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

14. The composition according to any one of Items 7 to 11, for use as an alternative refrigerant for R12, R134a, R404A, R407A, R407C, R407F, R407H, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

15. The composition according to any one of Items 1 to 14, for use as a working fluid for a refrigerating machine, wherein the composition further comprises a refrigeration oil.

16. A refrigerating machine comprising the composition according to any one of Items 1 to 14 as a working fluid.

17. A heat transfer medium comprising the composition according to any one of Items 1 to 14.

18. A heat cycle system using the heat transfer medium according to Item 17.

19. A composition comprising a refrigerant, the refrigerant comprising 1,1-difluoroethylene (HFO-1132a), the composition being for use as an alternative refrigerant for R12, R22, R134a, R404A, R407A, R407C, R407F, R407H, R410A, R413A, R417A, R422A, R422B, R422C, B422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

Advantageous Effects of Invention

The refrigerant (mixed refrigerant) according to the present disclosure has three types of performance; i.e., a coefficient of performance (COP) and a refrigerating capacity (Cap) that are equivalent to or higher than those of R404A and/or R410A, and a sufficiently low GWP.

DESCRIPTION OF EMBODIMENTS

The present inventors conducted extensive research to solve the above problem, and consequently found that a refrigerant (mixed refrigerant) comprising difluoromethane (HFC-32), 2,3,3,3-tetrafluoropropene (HFO-1234yf), and at least one of 1,1-difluoroethylene (HFO-1132a) and tetrafluoroethylene (FO-1114) has the performance described above.

The present disclosure has been completed as a result of further research based on this finding. The present disclosure includes the following embodiments.

Definition of Terms

In the present specification, the term "refrigerant" includes at least compounds that are specified in ISO 817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given.

Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC). Non-fluorocarbon compounds include propane (R290), propylene (R1270), butane (R600), isobutane (R600a), carbon dioxide (R744), ammonia (R717), and the like.

In the present specification, the phrase "composition comprising a refrigerant" at least includes (1) a refrigerant itself (including a mixture of refrigerants); (2) a composition that further comprises other components, and that can be mixed with at least a refrigeration oil to obtain a working fluid for a refrigerating machine; and (3) a working fluid for a refrigerating machine containing a refrigeration oil.

In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make the temperature thereof lower than the temperature of ambient air, and maintain a low temperature. In other words, refrigerating machines refer to conversion machines that gain energy from the outside to do work; and that perform energy conversion, in order to transfer heat from where the temperature is lower to where the temperature is higher.

In the present specification, the term "temperature glide" can be rephrased as an absolute value of the difference between the starting temperature and the ending temperature of the phase change process of the composition comprising a refrigerant according to the present disclosure within the constituent elements of a heat cycle system.

1. Refrigerant 1-1. Refrigerant Component

The refrigerant according to the present disclosure comprises difluoromethane (HFC-32), 2,3,3,3-tetrafluoropropene (HFO-1234yf), and at least one of 1,1-difluoroethylene (HFO-1132a) and tetrafluoroethylene (FO-1114). The refrigerant according to the present disclosure, which has the above feature, has three types of performance; i.e., a coefficient of performance (COP) and a refrigerating capacity (Cap) that are equivalent to or higher than those of R404A and/or R410A, and a sufficiently low GWP.

In the present disclosure, a coefficient of performance (COP) that is equivalent to or higher than that of R404A means that the COP ratio relative to R404A is 100% or more (preferably 103% or more, and more preferably 105% or more). A refrigerating capacity (Cap) that is equivalent to or higher than that of R404A means that the Cap ratio relative to R404A is 80% or more (preferably 90% or more, more preferably 95% or more, and most preferably 100% or more).

A coefficient of performance (COP) that is equivalent to or higher than that of R410A means that the COP ratio relative to R410A is 90% or more (preferably 93% or more, more preferably 95% or more, and most preferably 100% or more). A refrigerating capacity (Cap) that is equivalent to or higher than that of R410A means that the Cap ratio relative to R410A is 80% or more (preferably 95% or more, more preferably 99% or more, most preferably 100% or more).

Further, a sufficiently low GWP means that the GWP is 500 or less, preferably 400 or less, and more preferably 300 or less. In a refrigerant of a first embodiment described later, a sufficiently low GWP means that the GWP is 200 or less, preferably 170 or less, more preferably 150 or less, and even more preferably 130 or less.

The refrigerant according to the present disclosure comprises HFC-32, HFO-1234yf, and at least one of HFO-1132a and FO-1114. The composition of the refrigerant is not limited, as long as the performance described above is exhibited. In particular, the refrigerant preferably has a composition in which the GWP of the refrigerant is 500 or less (in particular, the GWP is 170 or less in the refrigerant of the first embodiment described later). Regarding at least one of HFO-1132a and FO-1114, the refrigerant may comprise either HFO-1132a or FO-1114, or both. In the present disclosure, the refrigerant preferably comprises HFO-1132a.

Figure 1:
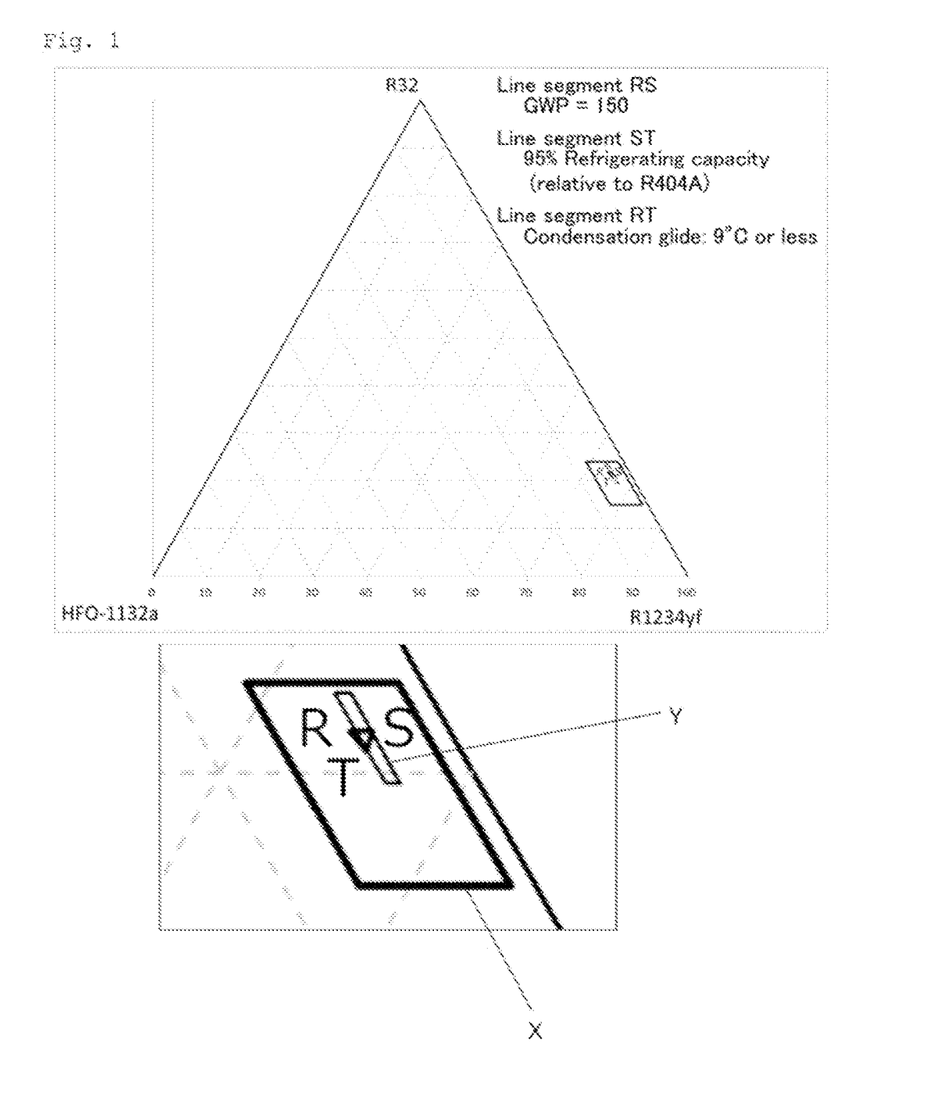
FIG. 1 is a ternary composition diagram for explaining the compositions of refrigerants of the first embodiment and the second embodiment of the present disclosure. In the enlarged view of FIG. 1, the maximum composition of the refrigerant of the first embodiment is within the range of a quadrangular region indicated by X, or on the line segments of the quadrangular region. In the enlarged view of FIG. 1, a preferable composition of the refrigerant of the first embodiment is within the range of a quadrangular region indicated by Y, or on the line segments of the quadrangular region. In the enlarged view of FIG. 1, the composition of the refrigerant of the second embodiment is within the range of a triangular region surrounded by line segments RS, ST, and TR; or on the line segments.

Specifically, the refrigerant according to the present disclosure preferably comprises HFC-32, HFO-1234yf, and HFO-1132a, and is preferably a mixed refrigerant comprising HFO-1234yf, HFC-32 in an amount of 15.0 to 24.0 mass %, and HFO-113a in an amount of 1.0 to 7.0 mass, based on the total amount of these three components taken as 100 mass % (the refrigerant of the first embodiment; within the range of a quadrangular region indicated by X, or on the line segments of the quadrangular region in the enlarged view of FIG. 1). In particular, the refrigerant according to the present disclosure is preferably a mixed refrigerant comprising HFO-1234yf, HFC-32 in an amount of 19.5 to 23.5 mass %, and HFO-1132a in an amount of 3.1 to 3.7 mass % (a preferable refrigerant of the first embodiment; within the range of a quadrangular region indicated by Y, or on the line segments of the quadrangular region in the enlarged view of FIG. 1). When the composition of the refrigerant is within the above ranges, the predetermined effects of the present disclosure are easily exhibited. The refrigerant of the first embodiment is particularly useful as an alternative refrigerant for R404A.

The refrigerant (the refrigerant of the first embodiment) according to the present disclosure preferably has a condensation temperature glide of 12° C. or less, more preferably 10° C. or less, and even more preferably 9° C. or less. Moreover, the compressor outlet pressure is preferably within the range of 1.60 to 2.00 MPa, and more preferably 1.73 to 1.91 MPa. The refrigerant according to the present disclosure has a characteristic such that it has good miscibility with a known refrigeration oil described later, when mixed with the refrigeration oil.

The refrigerant of the first embodiment encompasses a refrigerant of a second embodiment within its compositional range.

The refrigerant (the refrigerant of the second embodiment) according to the present disclosure comprises HFC-32, HFO-1234yf, and HFO-1132a,
wherein
when the mass % of HFC-32, HFO-1132a, and HFO-1234yf based on their sum in the refrigerant is respectively represented by x, y, and z, coordinates (x, y, z) in a ternary composition diagram in which the sum of RFC-32, HFO-1132a, and HFO-1234yf is 100 mass % are within the range of a triangular region surrounded by line segments RS, ST, and TR that connect the following 3 points:
point R (21.80, 3.95, 74.25),
point S (21.80, 3.05, 75.15), and
point T (20.95, 75.30, 3.75),
or on the line segments (within the triangular region surrounded by the line segments RS, ST, and TR; or on the line segments in the enlarged view of FIG. 1).

When the requirements above are satisfied, the refrigerant (the refrigerant of the second embodiment) according to the present disclosure has a coefficient of performance (COP) that is equivalent to or higher than that of R404A, a refrigerating capacity (Cap) of 95% or more, a GWP of 150 or less, and a condensation temperature glide of 9° C. or less.

The refrigerant according to the present disclosure encompasses refrigerants of the following third to seventh embodiments, in addition to the refrigerants of the first embodiment and the second embodiment. The refrigerants of the third to seventh embodiments are particularly useful as alternative refrigerants for R410A.

The refrigerant (the refrigerant of the third embodiment) according to the present disclosure comprises HFC-32, HFO-1234yf, and HFO-1132a,
wherein
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments LF, FG, GO, OB, and BL that connect the following 5 points:
point L (74.0, 19.9, 6.1),
point F (49.1, 25.9, 25.0),
point G (0.0, 48.6, 51.4),
point O (0.0, 0.0, 100), and
point B (73.9, 0.0, 26.1),
or on the line segments (excluding the line segments GO and OB),
the line segment LF is represented by coordinates ($y=0.0021x^2-0.4975x+45.264$),
the line segment FG is represented by coordinates ($y=0.0031x^2-0.6144x+48.6$), and
the line segments GO, OB, and BL are straight lines.

When the requirements above are satisfied, the refrigerant (the refrigerant of the third embodiment) according to the present disclosure has a coefficient of performance (COP) and a refrigerating capacity (Cap) that are equivalent to or higher than those of R410A, a GWP of 500 or less, and a compressor outlet pressure that is less than or equal to 1.25 times that of R410A. The compressor outlet pressure is preferably 3.4 MPa or less, and more preferably 3.0 MPa or less.

Figure 2:
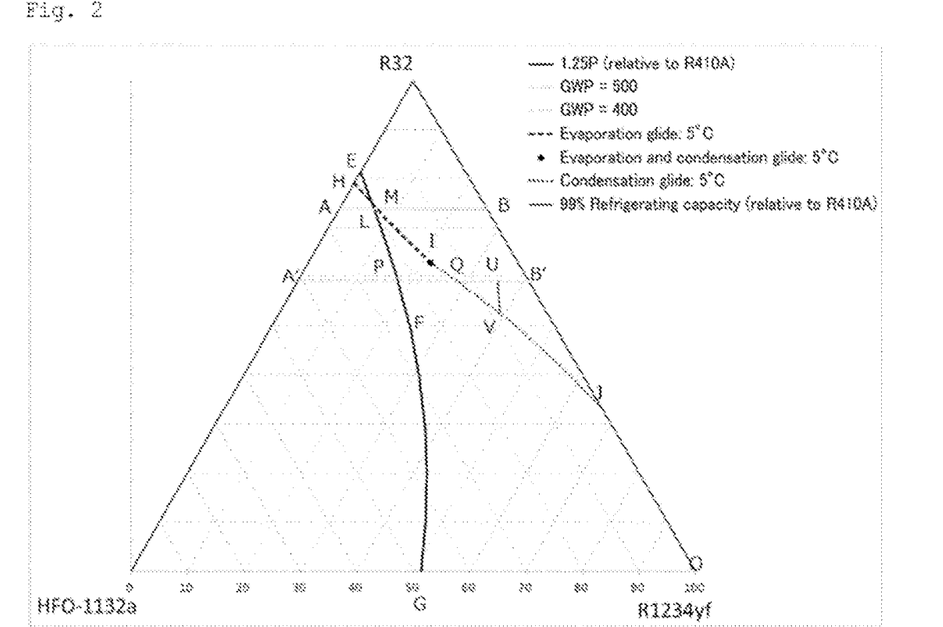
FIG. 2 is a ternary composition diagram for explaining the compositions of refrigerants of the third to seventh embodiments of the present disclosure.

For line segment EF (including the line segment LF and line segment PF), an approximate curve was determined from three points; i.e., the point E in a table and FIG. 2 of the present specification, Example 24, and the point F by using the least-squares method. For the line segment FG, an approximate curve was determined from three points; i.e., the point F, Example 26, and the point G by using the least-squares method.

The refrigerant (the refrigerant of the fourth embodiment) according to the present disclosure comprises HFC-32, HFO-1234yf, and HFO-1132a,
wherein
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments PF, FG, GO, OB', and B'P that connect the following 5 points:
point P (59.1, 23.2, 17.7),
point F (49.1, 25.9, 25.0),
point G (0.0, 48.6, 51.4),
point O (0.0, 0.0, 100), and
point B' (59.0, 0.0, 40.2),
or on the line segments (excluding the line segments GO and OB'),
the line segment PF is represented by coordinates ($y=0.0021x^2-0.4975x+45.264$), the line segment FG is represented by coordinates
(y=0.0031x²−0.6144x+48.6), and the line segments GO, OB', and B'P are straight lines.

When the requirements above are satisfied, the refrigerant (the refrigerant of the fourth embodiment) according to the present disclosure has a coefficient of performance (COP) and a refrigerating capacity (Cap) that are equivalent to or higher than those of R410A, a GWP of 400 or less, and a compressor outlet pressure that is less than or equal to 1.25 times that of R410A. The compressor outlet pressure is preferably 3.4 MPa or less, and more preferably 3.0 MPa or less.

The refrigerant (the refrigerant of the fifth embodiment) according to the present disclosure comprises HFC-32, HFO-1234yf, and HFO-1132a, wherein
when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments MI, IJ, JB, and BM that connect the following 4 points:
point M (74.0, 19.5, 6.5),
point I (62.9, 15.5, 21.6),
point J (33.5, 0.0, 66.5), and
point B (73.9, 0.0, 26.1),
or on the line segments (excluding the line segment JB),
the line segment MI is represented by coordinates
(y=0.006x₂+1.1837x−35.264),
the line segment IJ is represented by coordinates
(y=0.0083x²−0.2719x−0.1953), and
the line segments JB and BM are straight lines.

When the requirements above are satisfied, the refrigerant (the refrigerant of the fifth embodiment) according to the present disclosure has a coefficient of performance (COP) and a refrigerating capacity (Cap) that are equivalent to or higher than those of R410A, a GWP of 500 or less, and a compressor outlet pressure that is less than or equal to 1.25 times that of R410A. The compressor outlet pressure is preferably 3.4 MPa or less, and more preferably 3.0 MPa or less. Moreover, the refrigerant (the refrigerant of the fifth embodiment) according to the present disclosure has a condensation temperature glide and an evaporating temperature glide that are both as small as 5° C. or less, and is particularly suitable as an alternative for R410A.

For line segment HI (including the line segment MI), an approximate curve was determined from three points; i.e., the point H in a table and FIG. 2 of the present specification, Example 21, and the point I by using the least-squares method. For the line segment IJ, an approximate curve was determined from three points; i.e., the point I, Example 23, and the point J, by using the least-squares method.

The refrigerant (the refrigerant of the sixth embodiment) according to the present disclosure comprises HFC-32, HFO-1234yf, and HFO-1132a, wherein
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments QJ, JB', and B'Q that connect the following 3 points:

point Q (59.1, 12.7, 28.2),
point J (33.5, 0.0, 66.5), and
point B' (59.0, 0.0, 40.2),
or on the line segments (excluding the line segment JB' ),
the line segment QJ is represented by coordinates
(y=0.0083x²−0.2719x−0.1953), and
the line segments JB' and B'Q are straight lines.

When the requirements above are satisfied, the refrigerant (the refrigerant of the sixth embodiment) according to the present disclosure has a coefficient of performance (COP) and a refrigerating capacity (Cap) that are equivalent to or higher than those of R410A, a GWP of 400 or less, and a compressor outlet pressure that is less than or equal to 1.25 times that of R410A. The compressor outlet pressure is preferably 3.4 MPa or less, and more preferably 3.0 MPa or less. Moreover, the refrigerant (the refrigerant of the sixth embodiment) according to the present disclosure has a small evaporating temperature glide of 5° C. or less, preferably 4° C. or less, and more preferably 3.5° C. or less; and is particularly suitable as an alternative for R410A.

The refrigerant (the refrigerant of the seventh embodiment) according to the present disclosure comprises HFC-32, HFO-1234yf, and HFO-1132a, wherein
when the mass % of HFC-32, HFO-1132a, and HFO-1234yf based on their sum in the refrigerant is respectively represented by x, y, and z, coordinates (x, y, z) in a ternary composition diagram in which the sum of HFC-32, HFO-1132a, and HFO-1234yf is 100 mass % are within the range of a figure surrounded by line segments QU, UV, and VQ that connect the following 3 points:
point Q (59.1, 12.7, 28.2),
point U (59.0, 5.5, 35.5), and
point V (52.5, 8.4, 39.1),
or on the line segments,
the line segment VQ is represented by coordinates
(y=0.0083x²−0.2719x−0.1953),
the line segment UV is represented by coordinates
(y=0.0026x²−0.7385x+39.946), and
the line segment QU is a straight line.

When the requirements above are satisfied, the refrigerant (the refrigerant of the seventh embodiment) according to the present disclosure has a coefficient of performance (COP) and a refrigerating capacity (Cap) (a refrigerating capacity of 99% or more relative to that of R410A) that are equivalent to or higher than those of R410A, a GWP of 400 or less, and a compressor outlet pressure that is less than or equal to 1.25 times that of R410A. The compressor outlet pressure is preferably 3.4 MPa or less, and more preferably 3.0 MPa or less. Moreover, the refrigerant (the refrigerant of the seventh embodiment) according to the present disclosure has a small evaporating temperature glide of 5° C. or less, preferably 4° C. or less, and more preferably 3.5° C. or less; and is particularly suitable as an alternative for R410A.

For the line segment UV, an approximate curve was determined from three points; i.e., the point U in a table and FIG. 2 of the present specification, Example 28, and the point V, by using the least-squares method.

As exemplified by the refrigerants of the first to seventh embodiments, alternative refrigerants for a conventional refrigerant such as R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A, the alternative refrigerants comprising HFO-1132a, are proposed for the first time in the present disclosure. The present disclosure encompasses in its broadest sense an invention directed to "a composition comprising a refrigerant, the refrigerant comprising 1,1-difluoroethylene (HFO-1132a), the composition being for use as an alternative refrigerant for R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A." In particular, the present disclosure encompasses an invention directed to "a composition comprising a refrigerant, the refrigerant comprising 1,1-difluoroethylene (HFO-1132a), the composition being for use as an alternative refrigerant for R410A" as a preferable one.

Mixed Refrigerant Further Comprising Other Additional Refrigerants

The refrigerant according to the present disclosure may be a mixed refrigerant further comprising one or more other additional refrigerants in addition to HFC-32, HFO-1234yf, and at least one of HFO-1132a and FO-1114, as long as the above characteristics and effects are not impaired. In this case, the total amount of HFC-32, HFO-1234yf, and at least one of HFO-1132a and FO-1114 is preferably 99.5 mass % or more and less than 100 mass %, more preferably 99.75 mass % or more and less than 100 mass %, and even more preferably 99.9 mass % or more and less than 100 mass %, based on the entire refrigerant according to the present disclosure.

The additional refrigerants are not limited, and can be selected from a wide range of known refrigerants widely used in the field. The mixed refrigerant may comprise a single additional refrigerant, or two or more additional refrigerants.

1-2. Use

The refrigerant according to the present disclosure can be preferably used as a working fluid in a refrigerating machine.

The composition comprising a refrigerant according to the present disclosure is suitable for use as an alternative refrigerant for a conventional refrigerant such as R12, R22, R134a, R404A, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

In particular, the composition comprising the refrigerant (in particular, the refrigerant of the first embodiment or the refrigerant of the second embodiment) according to the present disclosure is particularly suitable for use as an alternative refrigerant for R404A. As alternative refrigerants with a reduced GWP for R404A, a refrigerant containing R32 and R1234yf in respective amounts of 21.5% and 78.5% (R454C); a refrigerant containing R32, R1234yf, and R152a in respective amounts of 18%, 70%, and 12% (R457A); and like refrigerants are conventionally known. The refrigerants according to the present disclosure (in particular, the refrigerants of the first embodiment and the second embodiment) are superior in refrigerating capacity to these conventional alternative refrigerants for R404A.

The composition comprising the refrigerant according to the present disclosure (in particular, the third to seventh embodiments) is particularly suitable for use as an alternative refrigerant for R410A. In particular, the refrigerant of the fifth embodiment is suitable as an alternative refrigerant for R410A in terms of a condensation temperature glide and an evaporating temperature glide that are both as small as 5° C. or less in addition to the COP, Cap, and GWP. The refrigerants of the sixth embodiment and the seventh embodiment are suitable as alternative refrigerants for R410A in terms of a small evaporating temperature glide of 5° C. or less, in addition to the COP, Cap, and GWP.

2. Refrigerant Composition

The refrigerant composition according to the present disclosure comprises at least the refrigerant according to the present disclosure, and can be used for the same use as the refrigerant according to the present disclosure.

Moreover, the refrigerant composition according to the present disclosure can be further mixed with at least a refrigeration oil, to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary.

As described above, when the refrigerant composition according to the present disclosure is used as a working fluid in a refrigerating machine, it is generally used as a mixture with at least a refrigeration oil.

Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 0 to 1 mass %, more preferably 0 to 0.5 mass %, even more preferably 0 to 0.25 mass %, and particularly preferably 0 to 0.1 mass %.

2-1. Water

The refrigerant composition according to the present disclosure may contain a small amount of water. The water content of the refrigerant composition is preferably 0 to 0.1 mass %, more preferably 0 to 0.075 mass %, even more preferably 0 to 0.05 mass %, and particularly preferably 0 to 0.025 mass % based on the entire refrigerant.

A small amount of water contained in the refrigerant composition stabilizes double bonds in the molecules of unsaturated fluorocarbon compounds that can be present in the refrigerant; and makes it less likely that the unsaturated fluorocarbon compounds will be oxidized, thus increasing the stability of the refrigerant composition. To attain the above effects that are obtained by containing water, the lower limit of the water content is about 0.001 mass %. For example, the water content can be adjusted in the range of 0.001 to 0.1 mass %, 0.001 to 0.075 mass %, 0.001 to 0.05 mass %, and 0.001 to 0.025 mass %.

2-2. Tracer

A tracer is added to the refrigerant composition according to the present disclosure at a detectable concentration such that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers. It is preferable that a compound that cannot be an impurity inevitably mixed into the refrigerant according to the present disclosure is selected as the tracer.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Of these, hydrofluorocarbons, hydrochlorofluorocarbons, chlorofluorocarbons, hydrochlorocarbons, fluorocarbons, and fluoroethers are preferable.

Specifically, the following compounds (also referred to below as "tracer compounds") are more preferable as tracers.

HCC-40 (chloromethane, $CH_3Cl$)
HFC-41 (fluoromethane, $CH_3F$)
HFC-161 (fluoroethane, $CH_3CH_2F$)
HFC-245fa (1,1,1,3,3-pentafluoropropane, $CF_3CH_2CHF_2$)
HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HCFC-22 (chlorodifluoromethane, $CHClF_2$)
HCFC-31 (chlorofluoromethane, $CH_2ClF$)
CFC-1113 (chlorotrifluoroethylene, $CF_2{=}CClF$)
HFE-125 (trifluoromethyl difluoro methyl ether, $CF_3OCHF_2$)
HFE-134a (trifluoromethyl fluoromethyl ether, $CF_3OCH_2F$)
HFE-143a (trifluoromethyl methyl ether, $CF_3OCH_3$)
HFE-227ea (trifluoromethyl tetrafluoro ethyl ether, $CF_3OCHFCF_3$)
HFE-236fa (trifluoromethyl trifluoro ethyl ether, $CF_3OCH2CF_3$)

The tracer compound can be present in the refrigerant composition at a total concentration of 10 parts per million by weight (ppm) to 1000 ppm. The tracer compound is preferably present in the refrigerant composition at a total concentration of 30 ppm to 500 ppm, more preferably 50 ppm to 300 ppm, even more preferably 75 ppm to 250 ppm, and particularly preferably 100 ppm to 200 ppm.

2-3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. Of these, naphthalimide and coumarin are preferable.

2-4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, amines, and the like.

Examples of nitro compounds include aliphatic nitro compounds, such as nitromethane and nitroethane; aromatic nitro compounds, such as nitro benzene and nitro styrene; and the like.

Examples of ethers include 1,4-dioxane and the like.

Examples of amines include 2,2,3,3,3-pentafluoropropylamine, diphenylamine, and the like.

Examples of stabilizers also include butylhydroxyxylene, benzotriazole, and the like in addition to the nitro compounds, ethers, and amines.

The content of the stabilizer is not limited. The content of the stabilizer is generally 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

The stability of the refrigerant composition according to the present disclosure can be evaluated by a commonly used method, without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

2-5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors. Examples of polymerization inhibitors include 4-methoxy-1-naphthol, hydroquinone, hydroquinone methyl ether, dimethyl-t-butylphenol, 2, 6-di-tert-butyl-p-cresol, benzotriazole, and the like.

The content of the polymerization inhibitor is not limited. The content of the polymerization inhibitor is generally 0.01 to 5 mass %, preferably 0.05 to 3 mass %, more preferably 0.1 to 2 mass %, even more preferably 0.25 to 1.5 mass %, and particularly preferably 0.5 to 1 mass %, based on the entire refrigerant.

3. Refrigeration Oil-Containing Working Fluid

The refrigeration oil-containing working fluid according to the present disclosure comprises at least the refrigerant or refrigerant composition according to the present disclosure and a refrigeration oil, for use as a working fluid in a refrigerating machine. Specifically, the refrigeration oil-containing working fluid according to the present disclosure is obtained by mixing a refrigeration oil used in a compressor of a refrigerating machine with the refrigerant or the refrigerant composition.

The content of the refrigeration oil is not limited. The content of the refrigeration oil is generally 10 to 50 mass %, preferably 12.5 to 45 mass %, more preferably 15 to 40 mass %, even more preferably 17.5 to 35 mass %, and particularly preferably 20 to 30 mass %, based on the entire refrigeration oil-containing working fluid.

3-1. Refrigeration Oil

The refrigeration oil-containing working fluid according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture of refrigerants according to the present disclosure (the mixed refrigerant according to the present disclosure) and the stability of the mixed refrigerant according to the present disclosure, for example, can be suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil.

The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 to 400 cSt at 40° C. is preferable from the standpoint of lubrication.

The refrigeration oil-containing working fluid according to the present disclosure may further optionally contain at least one additive. Examples of additives include the compatibilizing agents described below.

3-2. Compatibilizing Agent

The refrigeration oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, 1,1,1-trifluoroalkanes, and the like, of these, polyoxyalkylene glycol ethers are preferable.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises circulating the composition comprising a refrigerant according to the present disclosure as a working fluid in a refrigerating machine.

5. Heat Transfer Medium and Heat Cycle System Using Heat Transfer Medium

The heat transfer medium according to the present disclosure comprises the composition containing a refrigerant according to the present disclosure. The heat transfer medium according to the present disclosure can be suitably used for various heat cycle systems. A heat cycle system with high cooling capacity can be obtained by comprising the heat transfer medium according to the present disclosure.

Moreover, since the refrigerant according to the present disclosure has a sufficiently low GWP, a high degree of safety can be imparted to a heat cycle system by comprising the heat transfer medium according to the present disclosure, compared with the case of using an existing refrigerant.

Further, since the heat transfer medium according to the present disclosure has a low temperature glide, a highly stable heat cycle system can be provided.

The type of heat cycle system is not limited. Examples of heat cycle systems include room air conditioners, packaged air conditioners for stores, packaged air conditioners for buildings, packaged air conditioners for facilities, separate air conditioners connected with one or more indoor units and outdoor units through a refrigerant pipe, window air conditioners, portable air conditioners, rooftop or central air conditioners that send cool or warm air through a duct, gas engine heat pumps, air conditioners for trains, air conditioners for automobiles, built-in showcases, separate showcases, refrigerator-freezers for businesses, ice machines, integrated refrigerating machines, vending machines, automobile air conditioners, refrigerating machines for cooling containers or refrigerators such as for marine shipping, turbo refrigerating machines, and apparatuses exclusively used for a heating cycle. Examples of apparatuses exclusively used for a heating cycle include water-heating devices, floor-heating devices, snow-melting devices, and the like.

As long as the heat cycle systems listed above comprise the heat transfer medium according to the present disclosure, the other features of the heat cycle systems are not limited. For example, such a heat cycle system may have a structure similar to that of a known heat cycle system.

The embodiments are described above; however, it will be understood that various changes in forms and details can be made without departing from the spirit and scope of the claims.

EXAMPLES

The present disclosure is described in more detail below with reference to Examples. However, the present disclosure is not limited to the Examples.

Examples 1 to 16 and Comparative Example 1
(Corresponding to the Refrigerants of the First
Embodiment and the Second Embodiment)

Examples 17 to 87 and Comparative Examples 2 to
18 (Corresponding to the Refrigerants of the Third
to Seventh Embodiments)

The GWP of the mixed refrigerant shown in each of the Examples and the Comparative Examples, the GWP of R404A (R125/143a/R134a=44/52/4 wt %), and the GWP of R410A (R32/R125=50/50 wt %) were evaluated based on the values in the Intergovernmental Panel on Climate Change (IPCC) fourth report.

Further, the COP and refrigerating capacity of the mixed refrigerant shown in each of the Examples and the Comparative Examples, and the COP and refrigerating capacity of R404A were determined using the National Institute of Science and Technology (NIST), Reference Fluid Thermodynamic and Transport Properties Database (Refprop 9.0). Specifically, the COP and refrigerating capacity in Examples 1 to 16 and Comparative Example 1 (corresponding to the refrigerants of the first embodiment and the second embodiment) were determined by performing theoretical refrigeration cycle calculations for the mixed refrigerants under the following conditions.

Evaporating temperature: −40° C.
Condensation temperature: 40° C.
Superheating temperature: 20K
Subcooling temperature: 0K Compressor efficiency: 70%

The COP and refrigerating capacity in Examples 17 to 87 and Comparative Examples 2 to 18 (corresponding to the refrigerants of the third to seventh embodiments) were determined by performing theoretical refrigeration cycle calculations for the mixed refrigerants under the following conditions.

Evaporating temperature: 5° C.
Condensation temperature: 45° C.
Superheating temperature: 5K
Subcooling temperature: 5K
Compressor efficiency: 70%

Further, the condensation temperature glide, the evaporating temperature glide, and the compressor outlet pressure when the mixed refrigerant shown in each of the Examples and the Comparative Examples was used were also determined using Refprop 9.0.

Table 1 and Tables 2-1 to 2-12 show the GWP, COP, and refrigerating capacity calculated based on these results. The COP ratio and the refrigerating capacity ratio refer to the ratios (%) relative to R404A in Examples 1 to 16 and Comparative Example 1, and refer to the ratios (8) relative to R410A in Examples 17 to 87 and Comparative Examples 2 to 18.

The coefficient of performance (COP) was calculated according to the following equation.

$$COP = \text{(refrigerating capacity or heating capacity)} / \text{amount of electrical power consumed}$$

TABLE 1

| Example/ Comparative Example | Proportion (mass %) | | | GWP | Evaluation results | | | |
|---|---|---|---|---|---|---|---|---|
| | | | | | COP ratio (%) (relative to R404A) | Refrigerating capacity ratio (%) (relative to R404A) | Condensation temperature glide (K) | Compressor outlet pressure (MPa) |
| | R32 | R1234yf | HFO-1132a | | | | | |
| Comparative Example 1 | R404A | | | 3922 | 100 | 100 | 0.3 | 1.82 |
| Example 1 | 21.8 | 77.1 | 1.1 | 150 | 108 | 91 | 7.5 | 1.64 |
| Example 2 | 21.8 | 72.5 | 5.7 | 150 | 106 | 100 | 9.8 | 1.81 |
| Example 3 | 21.5 | 75.5 | 3 | 148 | 107 | 94 | 8.5 | 1.70 |
| Example 4 | 16.6 | 78.1 | 5.3 | 115 | 106 | 90 | 10.4 | 1.68 |
| Example 5 | 20 | 75 | 5 | 138 | 105 | 95 | 9.8 | 1.75 |
| Example 6 | 20 | 77.5 | 2.5 | 138 | 107 | 91 | 8.5 | 1.65 |
| Example 7 | 20 | 73 | 7 | 138 | 105 | 99 | 10.6 | 1.82 |
| Example 8 | 15 | 80 | 5 | 105 | 106 | 87 | 10.4 | 1.64 |
| Example 9 | 21.5 | 75 | 3.5 | 148 | 107 | 95 | 8.8 | 1.72 |
| Example 10 | 23.5 | 72.8 | 3.7 | 162 | 107 | 99 | 8.6 | 1.77 |
| Example 11 | 23.5 | 73.4 | 3.1 | 162 | 107 | 97 | 8.3 | 1.75 |
| Example 12 | 19.5 | 76.8 | 3.7 | 135 | 107 | 92 | 9.2 | 1.69 |
| Example 13 | 19.5 | 77.4 | 3.1 | 135 | 107 | 91 | 8.9 | 1.67 |
| Example 14 (point S) | 21.80 | 75.15 | 3.05 | 150 | 107 | 95 | 8.5 | 1.71 |
| Example 15 (point R) | 21.80 | 74.25 | 3.95 | 150 | 107 | 96 | 9.0 | 1.75 |
| Example 16 (point T) | 20.95 | 75.30 | 3.75 | 144 | 107 | 95 | 9.0 | 1.72 |

As is clear from the results in Table 1, the refrigerant of the second embodiment, in particular, has a coefficient of performance (COP) that is equivalent to or higher than that of R404A, a refrigerating capacity (Cap) of 95% or more, a GWP of 150 or less, and a condensation temperature glide of 9° C. or less; and is particularly excellent as an alternative refrigerant for R404A.

TABLE 2-1

| Item | Unit | Comparative Example 2 | Comparative Example 3 A | Example 17 L | Example 18 M | Comparative Example 4 B | Comparative Example 5 A' | Example 19 P |
|---|---|---|---|---|---|---|---|---|
| R32 | mass % | R4104 | 74.0 | 74.0 | 74.0 | 73.9 | 59.2 | 59.1 |
| R1132a | mass % |  | 26.0 | 19.9 | 19.5 | 0.0 | 40.6 | 23.2 |
| R1234yf | mass % |  | 0.0 | 6.1 | 6.5 | 26.1 | 0.0 | 17.7 |
| GWP | — | 2088 | 500 | 500 | 500 | 500 | 400 | 400 |
| COP ratio | % (relative to R410A) | 100 | 95 | 97 | 97 | 102 | 89 | 95 |
| Refrigerating capacity ratio | % (relative to R410A) | 100 | 131 | 124 | 124 | 99 | 139 | 121 |
| Compressor outlet pressure ratio | % (relative to R410A) | 100 | 134 | 125 | 124 | 95 | 153 | 125 |
| Condensation glide | ° C. | 0 | 4.6 | 4.6 | 4.5 | 1.0 | 3.9 | 5.5 |
| Evaporation glide | ° C. | 0.1 | 5.6 | 5.1 | 5.0 | 0.8 | 6.1 | 6.1 |

TABLE 2-2

| Item | Unit | Example 20 Q | Comparative Example 6 B' | Comparative Example 7 H | Example 21 | Example 22 I | Example 23 | Comparative Example 8 J |
|---|---|---|---|---|---|---|---|---|
| R32 | mass % | 59.1 | 59.0 | 79.2 | 71.2 | 62.9 | 51.0 | 33.5 |
| R1132a | mass % | 12.7 | 0.0 | 20.8 | 18.6 | 15.5 | 7.5 | 0.0 |
| R1234yf | mass % | 26.2 | 40.2 | 0.0 | 10.0 | 21.6 | 41.5 | 66.5 |
| GWP | — | 400 | 400 | 535 | 481 | 426 | 346 | 229 |
| COP ratio | % (relative to R410A) | 99 | 102 | 97 | 97 | 98 | 100 | 102 |
| Refrigerating capacity ratio | % (relative to R410A) | 108 | 92 | 127 | 122 | 114 | 97 | 75 |
| Compressor outlet pressure ratio | % (relative to R410A) | 109 | 89 | 128 | 122 | 115 | 97 | 75 |
| Condensation glide | ° C. | 5.0 | 2.0 | 4.3 | 4.6 | 5.0 | 5.0 | 5.0 |
| Evaporation glide | ° C. | 4.8 | 1.8 | 5.0 | 5.0 | 5.0 | 4.6 | 4.6 |

TABLE 2-3

| Item | Unit | Comparative Example 9 E | Example 24 | Example 25 F | Example 26 | Comparative Example 10 G | Example 27 U | Example 28 | Example 29 V |
|---|---|---|---|---|---|---|---|---|---|
| R32 | mass % | 81.3 | 65.9 | 49.1 | 29.2 | 0.0 | 59.0 | 55.8 | 52.5 |
| R1132a | mass % | 18.7 | 21.6 | 25.9 | 33.3 | 48.6 | 5.5 | 6.9 | 8.4 |
| R1234yf | mass % | 0.0 | 12.5 | 25.0 | 37.5 | 51.4 | 35.5 | 37.3 | 39.1 |
| GWP | — | 549 | 446 | 333 | 199 | 2 | 400 | 378 | 36 |
| COP ratio | % (relative to R410A) | 97 | 96 | 94 | 92 | 90 | 101 | 100 | 100 |
| Refrigerating capacity ratio | % (relative to R410A) | 126 | 122 | 118 | 113 | 108 | 99 | 99 | 99 |
| Compressor outlet pressure ratio | % (relative to R410A) | 125 | 125 | 125 | 125 | 125 | 96 | 99 | 99 |

TABLE 2-3-continued

| Item | Unit | Comparative Example 9 E | Example 24 | Example 25 F | Example 26 | Comparative Example 10 G | Example 27 U | Example 28 | Example 29 V |
|---|---|---|---|---|---|---|---|---|---|
| Condensation glide | ° C. | 4.2 | 5.0 | 6.4 | 8.9 | 14.5 | 3.7 | 4.3 | 5.0 |
| Evaporation glide | ° C. | 4.7 | 5.6 | 7.1 | 10.3 | 16.7 | 3.3 | 3.9 | 4.6 |

TABLE 2-4

| Item | Unit | Example 30 | Example 31 | Example 32 | Example 33 | Example 34 | Comparative Example 11 | Example 35 | Example 36 |
|---|---|---|---|---|---|---|---|---|---|
| R32 | mass % | 30.0 | 40.0 | 50.0 | 60.0 | 70.0 | 80.0 | 30.0 | 40.0 |
| R1132a | mass % | 5.0 | 5.0 | 5.0 | 5.0 | 5.0 | 5.0 | 10.0 | 10.0 |
| R1234yf | mass % | 65.0 | 55.0 | 45.0 | 35.0 | 25.0 | 15.0 | 60.0 | 50.0 |
| GWP | — | 205 | 272 | 339 | 406 | 474 | 541 | 205 | 272 |
| COP ratio | % (relative to R410A) | 101 | 101 | 101 | 101 | 101 | 101 | 100 | 99 |
| Refrigerating capacity ratio | % (relative to R410A) | 79 | 86 | 93 | 99 | 104 | 109 | 86 | 83 |
| Compressor outlet pressure ratio | % (relative to R410A) | 80 | 87 | 93 | 97 | 101 | 105 | 88 | 95 |
| Condensation glide | ° C. | 7.6 | 5.9 | 4.5 | 3.5 | 2.8 | 2.2 | 8.9 | 7.0 |
| Evaporation glide | ° C. | 6.8 | 5.4 | 4.1 | 3.1 | 2.4 | 2.0 | 8.1 | 6.5 |

TABLE 2-5

| Item | Unit | Example 37 | Example 38 | Example 39 | Comparative Example 12 | Example 40 | Example 41 | Example 42 | Example 43 |
|---|---|---|---|---|---|---|---|---|---|
| R32 | mass % | 50.0 | 60.0 | 70.0 | 80.0 | 30.0 | 40.0 | 50.0 | 60.0 |
| R1132a | mass % | 10.0 | 10.0 | 10.0 | 10.0 | 15.0 | 15.0 | 15.0 | 15.0 |
| R1234yf | mass % | 40.0 | 30.0 | 20.0 | 10.0 | 55.0 | 45.0 | 35.0 | 25.0 |
| GWP | — | 339 | 406 | 473 | 541 | 205 | 272 | 339 | 406 |
| COP ratio | % (relative to R410A) | 99 | 99 | 99 | 100 | 98 | 98 | 98 | 98 |
| Refrigerating capacity ratio | % (relative to R410A) | 100 | 105 | 110 | 115 | 92 | 99 | 106 | 112 |
| Compressor outlet pressure ratio | % (relative to R410A) | 101 | 105 | 109 | 112 | 96 | 103 | 108 | 113 |
| Condensation glide | ° C. | 5.6 | 4.6 | 3.8 | 3.3 | 9.7 | 7.7 | 6.2 | 5.2 |
| Evaporation glide | ° C. | 5.2 | 4.2 | 3.6 | 3.2 | 9.1 | 7.4 | 6.1 | 5.1 |

TABLE 2-6

| Item | Unit | Example 44 | Comparative Example 13 | Example 45 | Example 46 | Example 47 | Example 48 | Example 49 | Example 50 |
|---|---|---|---|---|---|---|---|---|---|
| R32 | mass % | 70.0 | 80.0 | 30.0 | 40.0 | 50.0 | 60.0 | 70.0 | 30.0 |
| R1132a | mass % | 15.0 | 15.0 | 20.0 | 20.0 | 20.0 | 20.0 | 20.0 | 25.0 |
| R1234yf | mass % | 15.0 | 5.0 | 50.0 | 40.0 | 30.0 | 20.0 | 10.0 | 45.0 |
| GWP | — | 473 | 540 | 205 | 272 | 339 | 406 | 473 | 205 |
| COP ratio | % (relative to R410A) | 98 | 98 | 97 | 96 | 96 | 96 | 97 | 95 |
| Refrigerating capacity ratio | % (relative to R410A) | 117 | 121 | 98 | 106 | 112 | 118 | 122 | 104 |
| Compressor outlet pressure ratio | % (relative to R410A) | 116 | 119 | 104 | 111 | 116 | 120 | 124 | 112 |

TABLE 2-6-continued

| Item | Unit | Example 44 | Comparative Example 13 | Example 45 | Example 46 | Example 47 | Example 48 | Example 49 | Example 50 |
|---|---|---|---|---|---|---|---|---|---|
| Condensation glide | ° C. | 4.5 | 3.9 | 9.9 | 7.9 | 6.4 | 5.5 | 4.8 | 9.7 |
| Evaporation glide | ° C. | 4.5 | 4.1 | 9.8 | 8.0 | 6.7 | 5.8 | 5.2 | 10.2 |

TABLE 2-7

| Item | Unit | Example 51 | Example 52 | Comparative Example 14 | Comparative Example 15 | Example 53 | Comparative Example 16 | Comparative Example 17 | Comparative Example 18 |
|---|---|---|---|---|---|---|---|---|---|
| R32 | mass % | 40.0 | 50.0 | 60.0 | 70.0 | 30.0 | 40.0 | 50.0 | 60.0 |
| R1132a | mass % | 25.0 | 25.0 | 25.0 | 25.0 | 30.0 | 30.0 | 30.0 | 30.0 |
| R1234yf | mass % | 35.0 | 25.0 | 15.0 | 5.0 | 40.0 | 30.0 | 20.0 | 10.0 |
| GWP | — | 272 | 339 | 406 | 473 | 204 | 272 | 339 | 406 |
| COP ratio | % (relative to R410A) | 96 | 95 | 95 | 96 | 93 | 93 | 93 | 93 |
| Refrigerating capacity ratio | % (relative to R410A) | 112 | 118 | 123 | 128 | 110 | 117 | 123 | 129 |
| Compressor outlet pressure ratio | % (relative to R410A) | 119 | 124 | 128 | 131 | 120 | 127 | 132 | 136 |
| Condensation glide | ° C. | 7.7 | 6.3 | 5.4 | 4.8 | 9.2 | 7.3 | 6.0 | 5.1 |
| Evaporation glide | ° C. | 8.3 | 7.0 | 6.2 | 5.7 | 10.3 | 8.4 | 7.1 | 6.4 |

TABLE 2-8

| Item | Unit | Example 54 | Example 55 | Example 56 | Example 57 | Example 58 | Example 59 | Example 60 | Example 61 |
|---|---|---|---|---|---|---|---|---|---|
| R32 | mass % | 39.0 | 41.0 | 43.0 | 45.0 | 47.0 | 49.0 | 51.0 | 53.0 |
| R1132a | mass % | 1.0 | 1.0 | 1.0 | 1.0 | 1.0 | 1.0 | 1.0 | 1.0 |
| R1234yf | mass % | 60.0 | 58.0 | 56.0 | 54.0 | 52.0 | 50.0 | 48.0 | 46.0 |
| GWP | — | 266 | 279 | 293 | 306 | 319 | 333 | 346 | 360 |
| COP ratio | % (relative to R410A) | 102 | 102 | 102 | 102 | 102 | 102 | 102 | 102 |
| Refrigerating capacity ratio | % (relative to R410A) | 80 | 82 | 83 | 85 | 86 | 87 | 88 | 90 |
| Compressor outlet pressure ratio | % (relative to R410A) | 80 | 81 | 83 | 84 | 85 | 86 | 87 | 88 |
| Condensation glide | ° C. | 4.6 | 4.3 | 4.1 | 3.8 | 3.6 | 3.3 | 3.1 | 2.9 |
| Evaporation glide | ° C. | 4.4 | 4.1 | 3.9 | 3.6 | 3.3 | 3.1 | 2.9 | 2.7 |

TABLE 2-9

| Item | Unit | Example 62 | Example 63 | Example 64 | Example 65 | Example 66 | Example 67 | Example 68 | Example 69 |
|---|---|---|---|---|---|---|---|---|---|
| R32 | mass % | 55.0 | 57.0 | 59.0 | 45.0 | 47.0 | 49.0 | 51.0 | 53.0 |
| R1132a | mass % | 1.0 | 1.0 | 1.0 | 3.0 | 3.0 | 3.0 | 3.0 | 3.0 |
| R1234yf | mass % | 44.0 | 42.0 | 40.0 | 52.0 | 50.0 | 46.0 | 46.0 | 44.0 |
| GWP | — | 373 | 386 | 400 | 306 | 319 | 333 | 346 | 360 |
| COP ratio | % (relative to R410A) | 102 | 102 | 102 | 101 | 101 | 101 | 101 | 101 |
| Refrigerating capacity ratio | % (relative to R410A) | 91 | 92 | 93 | 87 | 89 | 90 | 91 | 92 |
| Compressor outlet pressure ratio | % (relative to R410A) | 89 | 90 | 91 | 87 | 88 | 89 | 90 | 91 |

TABLE 2-9-continued

| Item | Unit | Example 62 | Example 63 | Example 64 | Example 65 | Example 66 | Example 67 | Example 68 | Example 69 |
|---|---|---|---|---|---|---|---|---|---|
| Condensation glide | ° C. | 2.7 | 2.5 | 2.3 | 4.5 | 4.3 | 4.0 | 3.8 | 3.6 |
| Evaporation glide | ° C. | 2.5 | 2.3 | 2.1 | 4.2 | 3.9 | 3.7 | 3.4 | 3.2 |

TABLE 2-10

| Item | Unit | Example 70 | Example 71 | Example 72 | Example 73 | Example 74 | Example 75 | Example 76 | Example 77 |
|---|---|---|---|---|---|---|---|---|---|
| R32 | mass % | 55.0 | 57.0 | 59.0 | 47.0 | 49.0 | 51.0 | 53.0 | 55.0 |
| R1132a | mass % | 3.0 | 3.0 | 3.0 | 5.0 | 5.0 | 5.0 | 5.0 | 5.0 |
| R1234yf | mass % | 42.0 | 40.0 | 38.0 | 48.0 | 46.0 | 44.0 | 42.0 | 40.0 |
| GWP | — | 373 | 386 | 400 | 319 | 333 | 346 | 359 | 373 |
| COP ratio | % (relative to R410A) | 101 | 101 | 101 | 101 | 101 | 101 | 101 | 101 |
| Refrigerating capacity ratio | % (relative to R410A) | 93 | 95 | 96 | 91 | 92 | 94 | 95 | 96 |
| Compressor outlet pressure ratio | % (relative to R410A) | 92 | 93 | 94 | 91 | 92 | 93 | 94 | 95 |
| Condensation glide | ° C. | 3.4 | 3.2 | 3.0 | 4.9 | 4.6 | 4.4 | 4.2 | 3.9 |
| Evaporation glide | ° C. | 3.0 | 2.8 | 2.7 | 4.4 | 4.2 | 4.0 | 3.7 | 3.5 |

TABLE 2-11

| Item | Unit | Example 78 | Example 79 | Example 80 | Example 81 | Example 82 | Example 83 | Example 84 | Example 85 |
|---|---|---|---|---|---|---|---|---|---|
| R32 | mass % | 57.0 | 59.0 | 53.0 | 55.0 | 57.0 | 59.0 | 55.0 | 57.0 |
| R1132a | mass % | 5.0 | 5.0 | 7.0 | 7.0 | 7.0 | 7.0 | 9.0 | 9.0 |
| R1234yf | mass % | 38.0 | 36.0 | 40.0 | 38.0 | 36.0 | 34.0 | 36.0 | 34.0 |
| GWP | — | 386 | 400 | 359 | 373 | 386 | 400 | 373 | 386 |
| COP ratio | % (relative to R410A) | 101 | 101 | 100 | 100 | 100 | 100 | 100 | 100 |
| Refrigerating capacity ratio | % (relative to R410A) | 97 | 98 | 98 | 99 | 100 | 101 | 101 | 102 |
| Compressor outlet pressure ratio | % (relative to R410A) | 96 | 97 | 97 | 98 | 99 | 100 | 101 | 102 |
| Condensation glide | ° C. | 3.8 | 3.6 | 4.7 | 4.4 | 4.2 | 4.1 | 4.9 | 4.7 |
| Evaporation glide | ° C. | 3.4 | 3.2 | 4.2 | 4.0 | 3.8 | 3.7 | 4.5 | 4.3 |

TABLE 2-12

| Item | Unit | Example 86 | Example 87 |
|---|---|---|---|
| R32 | mass % | 59.0 | 59.0 |
| R1132a | mass % | 9.0 | 11.0 |
| R1234yf | mass % | 32.0 | 30.0 |
| GWP | — | 400 | 400 |
| COP ratio | % (relative to R410A) | 100 | 99 |
| Refrigerating capacity ratio | % (relative to R410A) | 104 | 106 |
| Compressor outlet pressure ratio | % (relative to R410A) | 103 | 106 |
| Condensation glide | ° C. | 4.5 | 4.8 |
| Evaporation glide | ° C. | 4.1 | 4.5 |

As is clear from the results in Tables 2-1 to 2-12, when the predetermined requirements are satisfied, the refrigerant of the third embodiment has a coefficient of performance (COP) and a refrigerating capacity (Cap) that are equivalent to or higher than those of R410A, a GWP of 500 or less, and a compressor outlet pressure that is less than or equal to 1.25 times that of R410A; when the predetermined requirements are satisfied, the refrigerant of the fourth embodiment has a coefficient of performance (COP) and a refrigerating capacity (Cap) that are equivalent to or higher than those of R410A, a GWP of 400 or less, and a compressor outlet pressure that is less than or equal to 1.25 times that of R410A; when the predetermined requirements are satisfied, the refrigerant of the fifth embodiment has a coefficient of performance (COP) and a refrigerating capacity (Cap) that are equivalent to or higher than those of R410A, a GWP of 500 or less, a compressor outlet pressure that is less than or equal to 1.25 times that of R410A, and a condensation temperature glide and an evaporating temperature glide that are both as small as 5° C. or less; when the predetermined requirements are satisfied, the refrigerant of the sixth embodiment has a coefficient of performance (COP) and a refrigerating capacity (Cap) that are equivalent to or higher than those of R410A, a GWP of 400 or less, a compressor outlet pressure that is less than or equal to 1.25 times that of R410A, and a small evaporating temperature glide of 5° C. or less; and when the predetermined requirements are satisfied, the refrigerant of the seventh embodiment has a coefficient of performance (COP) and a refrigerating capacity (Cap) (99% or more relative to that of R410A) that are equivalent to or higher than those of R410A, a GWP of 400 or less, a compressor outlet pressure that is less than or equal to 1.25 times that of R410A, and a small evaporating temperature glide of 5° C. or less. All of the refrigerants of the third to seventh embodiments are suitable as alternative refrigerants for R410A. In particular, the refrigerant of the fifth embodiment or the sixth embodiment, both of which have a small condensation temperature glide and/or a small evaporating temperature glide, is particularly suitable as an alternative refrigerant for R410A. Furthermore, the refrigerant of the seventh embodiment, which has a small condensation temperature glide and/or a small evaporating temperature glide, and a coefficient of performance (COP) and a refrigerating capacity (Cap) (99% or more relative to that of R410A) that are equivalent to or higher than those of R410A, is further excellent as an alternative refrigerant for R410A.

The invention claimed is:

1. A composition comprising a refrigerant, the refrigerant comprising difluoromethane (HFC-32), 2,3,3,3-tetrafluoropropene (HFO-1234yf), and 1,1-difluoroethylene (HFO-1132a), wherein the refrigerant comprises HFC-32 in an amount of 15.0 to 24.0 mass % and HFO-1132a in an amount of 1.0 to 7.0 mass %, based on the total amount of HFC-32, HFO-1234yf, and HFO-1132a taken as 100 mass %.

2. The composition according to claim 1, wherein the refrigerant comprises HFC-32 in an amount of 19.5 to 23.5 mass % and HFO-1132a in an amount of 3.1 to 3.7 mass %, based on the total amount of HFC-32, HFO-1234yf, and HFO-1132a taken as 100 mass %.

3. The composition according to claim 1, for use as an alternative refrigerant for R404A.

4. The composition according to claim 1, for use as an alternative refrigerant for R12, R134a, R407A, R407C, R407F, R407H, R410A, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

5. The composition according to claim 1, for use as a working fluid for a refrigerating machine, wherein the composition further comprises a refrigeration oil.

6. A refrigerating machine comprising the composition according to claim 1 as a working fluid.

7. A heat transfer medium comprising the composition according to claim 1.

8. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein
the refrigerant comprises HFC-32, HFO-1234yf, and HFO-1132a, and
when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a triangular region surrounded by line segments RS, ST, and TR that connect the following 3 points:
point R (21.80, 3.95, 74.25),
point S (21.80, 3.05, 75.15), and
point T (20.95, 75.30, 3.75),
or on the line segments.

9. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments LF, FG, GO, OB, and BL that connect the following 5 points:
point L (74.0, 19.9, 6.1),
point F (49.1, 25.9, 25.0),
point G (0.0, 48.6, 51.4),
point O (0.0, 0.0, 100), and
point B (73.9, 0.0, 26.1),
or on the line segments (excluding the line segments GO and OB),
the line segment LF is represented by coordinates $(y=0.0021x^2-0.4975x+45.264)$,
the line segment FG is represented by coordinates $(y=0.0031x^2-0.6144x+48.6)$, and
the line segments GO, OB, and BL are straight lines.

10. The composition according to claim 9, for use as an alternative refrigerant for R410A, R12, R134a, R404A, R407A, R407C, R407F, R407H, R413A, R417A, R422A, R422B, R422C, R422D, R423A, R424A, R426A, R427A, R430A, R434A, R437A, R438A, R448A, R449A, R449B, R449C, R452A, R452B, R454A, R454B, R454C, R455A, R459A, R465A, R502, R507, or R513A.

11. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein
the refrigerant comprises HFC-32, HFO-1234yf, and HFO-1132a,
when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments PF, FG, GO, OB', and B'P that connect the following 5 points:
point P (59.1, 23.2, 17.7),
point F (49.1, 25.9, 25.0),
point G (0.0, 48.6, 51.4),
point O (0.0, 0.0, 100), and
point B' (59.0, 0.0, 40.2),
or on the line segments (excluding the line segments GO and OB'), the line segment PF is represented by coordinates ($y=0.0021x^2-0.4975x+45.264$), the line segment FG is represented by coordinates
($y=0.0031x^2-0.6144x+48.6$), and the line segments GO, OB', and B'P are straight lines.

12. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein the refrigerant comprises HFC-32, HFO-1234yf, and HFO-1132a, when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments MI, IJ, JB, and BM that connect the following 4 points:

point M (74.0, 19.5, 6.5),
point I (62.9, 15.5, 21.6),
point J (33.5, 0.0, 66.5), and
point B (73.9, 0.0, 26.1),
or on the line segments (excluding the line segment JB),
the line segment MI is represented by coordinates
($y=0.006x^2+1.1837x-35.264$),
the line segment IJ is represented by coordinates
($y=0.0083x^2-0.2719x-0.1953$), and
the line segments JB and BM are straight lines.

13. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein the refrigerant comprises HFC-32, HFO-1234yf, and HFO-1132a, when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments QJ, JB', and B'Q that connect the following 3 points:

point Q (59.1, 12.7, 28.2),
point J (33.5, 0.0, 66.5), and
point B' (59.0, 0.0, 40.2),
or on the line segments (excluding the line segment JB'),
the line segment QJ is represented by coordinates
($y=0.0083x^2-0.2719x-0.1953$), and
the line segments JB' and B'Q are straight lines.

14. A composition comprising a refrigerant, the refrigerant comprising difluoromethane (HFC-32), 2,3,3,3-tetrafluoropropene (HFO-1234yf), and at least one of 1,1-difluoroethylene (HFO-1132a) and tetrafluoroethylene (FO-1114), wherein the refrigerant comprises HFC-32, HFO-1234yf, and HFO-1132a, when the mass % of HFC-32, HFO-1132a, and HFO-1234yf based on their sum in the refrigerant is respectively represented by x, y, and z, coordinates (x,y,z) in a ternary composition diagram in which the sum of HFC-32, HFO-1132a, and HFO-1234yf is 100 mass % are within the range of a figure surrounded by line segments QU, UV, and VQ that connect the following 3 points:

point Q (59.1, 12.7, 28.2),
point U (59.0, 5.5, 35.5), and
point V (52.5, 8.4, 39.1),
or on the line segments,
the line segment VQ is represented by coordinates
($y=0.0083x^2-0.2719x-0.1953$),
the line segment UV is represented by coordinates
($y=0.0026x^2-0.7385x+39.946$), and
the line segment QU is a straight line.

\* \* \* \* \*